April 25, 1939. F. R. BELLUCHE Re. 21,055

SHEET FEEDING MACHINE

Original Filed Oct. 28, 1937 2 Sheets-Sheet 1

Inventor
Frank R. Belluche
By Dr. Nutter & Jones
Attorneys

April 25, 1939. F. R. BELLUCHE Re. 21,055

SHEET FEEDING MACHINE

Original Filed Oct. 28, 1937 2 Sheets-Sheet 2

Inventor
Frank R. Belluche
By Hamilton Jones
Attorney

Reissued Apr. 25, 1939

Re. 21,055

UNITED STATES PATENT OFFICE 21,055

SHEET FEEDING MACHINE

Frank R. Belluche, Racine, Wis.

Original No. 2,127,714, dated August 23, 1938, Serial No. 171,508, October 28, 1937. Application for reissue February 8, 1939, Serial No. 255,349

23 Claims. (Cl. 271—38)

This invention relates to improvements in sheet feeding machines of the continuous type in which a fanned-out bank or pile of sheets is continuously fed forwardly to a separator mechanism.

Originally, the separators used in this type of feeder employed a combing wheel which combed the topmost sheet forwardly and separated it from the pile or bank of sheets. But in answer to the recent requirement for higher operating speeds, the old combing wheel separator has been replaced by suction separators which pick off the topmost sheet and advance it to the feed off mechanism.

With this new suction type separator and the increased operating speeds, much difficulty has been experienced with the bank advancing or feeding means. Heretofore, the bank has been advanced during a small portion of the cycle of the machine so that at high speeds, the feeding motion has been so rapid that it would cause the bank to slip, sometimes as much as one inch.

With the old combing wheel type of separator, slipping of the bank was not serious as the combing wheel had time to comb a late sheet ahead, but with the suction type separator, it is important that the sheets do not slip since the suction separator picks up the sheet where it finds it and if it is behind the normal position, it will be out of time when it arrives at the front guides of the press.

This invention therefore has as one of its objects to improve the manner of feeding the bank forwardly and to completely remove all possibility of slippage by feeding the bank forward during the whole cycle so that the movement of the bank will be gentle.

Another object of this invention is to control the bank advancing mechanism directly from the topmost or foremost sheet of the bank whereby this sheet itself, whenever the bank is insufficiently advanced and functioning of the bank advancing mechanism is required, through coaction with a suitable control element adapted to be acted upon by the sheet, directly initiates the operation of the bank advancing mechanism.

Another object of this invention is to provide improved means for determining when the bank advancing mechanism is to operate wherein the control is effected by the lifting of a sheet from the bank.

A further object of this invention is to simplify the bank feeding mechanism of a continuous feeder and the control therefor.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate one complete example of the physical embodiment of the invention constructed in accordance with the best mode so far devised for the practical application of the principles thereof, and in which.

Figure 1:
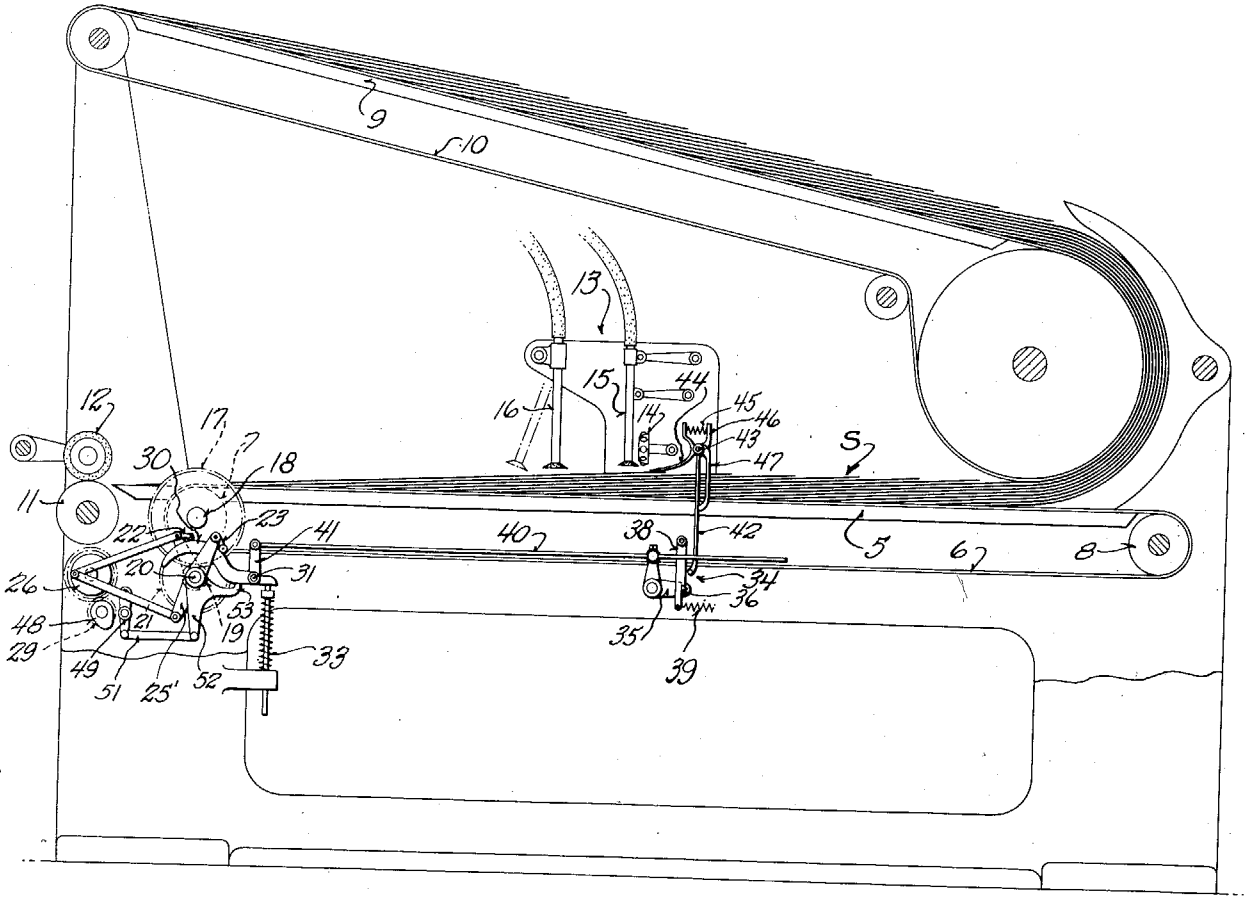
Figure 1 is a side view of a continuous type sheet feeder, illustrating the application of this invention thereto.

Referring now particularly to the accompanying drawings in which like numerals indicate like parts, the numeral 5 designates the feed board of a continuous type feeder over which a plurality of endless tapes 6 move to advance a bank of fanned-out sheets S forwardly. The endless tapes 6 upon which the bank of sheets rests are trained about pulleys 7 and 8, the former being driven in a manner to be hereinafter described.

As is customary, the sheets are loaded onto a supply table 9 disposed above the feed board and are advanced by tapes 10 which travel thereover downwardly through a reversing throat to be deposited on the feed board in the manner shown. At the forward end of the feed board is a set of feed off rollers 11 and 12, the roller 12 being a drop roller to drop onto the top of a sheet moved onto the roller 11 and advance the same forwardly toward the press or other machine being fed.

The sheets are deposited onto the roller 11 by a suction separator, indicated generally by the numeral 13. This separator comprises a pair of combing wheels 14 acting on the opposite side edge portions of the sheet at its rear and combing inwardly, suckers 15 to engage the buckled portion of the sheet and lift the same at its rear edge, and forwarding suckers 16 to engage the lifted sheet and advance it forwardly. Inasmuch as the separating and forwarding mechanism engages the sheets at their rear portions, they may be fed off the bank in underlapped relation.

While, as stated, two combing wheels 14 are employed, one to act on each side of the sheet, and as is customary, two or more sets of suckers 15 and 16 are employed across the width of the sheet, only one of each has been shown for simplicity of disclosure; and as will be readily apparent, the entire separator mechanism is adjustable longitudinally of the feed board to compensate for sheets of different lengths.

The drive for the roller 7 to advance the bank forwardly comprises a gear 17 fixed to the shaft 18 of the roller and driven by a pinion 19 secured to a shaft 20 suitably journalled from the frame of the feeder. Fastened to the shaft 20 is a ratchet wheel 21 and cooperating with the ratchet wheel are two pawls 22 and 23. The pawl 22 is carried by a lever 24 mounted to swing about the shaft 20 at one side of the ratchet wheel, and the pawl 23 is carried by a lever 25 also mounted to swing about the shaft 20 but at the other side of the ratchet wheel.

These levers are oscillated simultaneously in opposite directions by means of a crank plate 26 and links 27 and 28 connecting the crank pin of the plate 26 respectively with the levers 24 and 25. The link 27 is connected to the lever 24 directly, while the link 28 is connected to an oppositely extending end portion 25' on the lever 25.

The crank plate 26 is mounted in any suitable manner and is driven by a pinion 29 so as to have a speed of one revolution to two cycles of the machine. In this manner, when the pawls are engaged with the ratchet wheel, a continuous feeding motion is imparted to the roller 7 during the whole cycle of the machine.

When the bank is in proper position and forward feeding thereof is not required, the pawls 22 and 23 are held out of engagement with the ratchet wheel by masks 30. While there are two masks, one for each of the pawls, they are directly one behind the other so that only one shows in the drawings.

Figure 2:
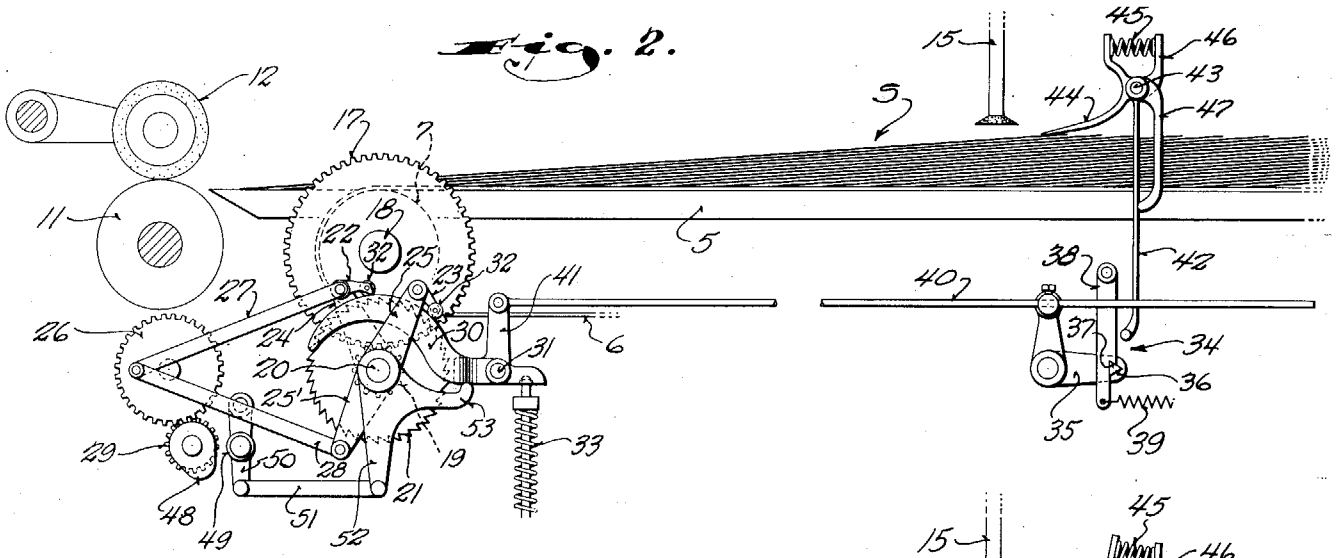
Figure 2 is an enlarged side view of the bank feeding mechanism and the control therefor, illustrating the same in an inoperative position.

These masks are pivotally supported on a shaft 31 and have outer curved surfaces concentric to the axis of the shaft 20 when held in their normal operative positions shown in Figures 1 and 2. When so disposed, rollers 32 carried on the outer ends of the pawls ride on these outer concentric surfaces of the masks holding the pawls clear of the ratchet wheel.

Figure 3:
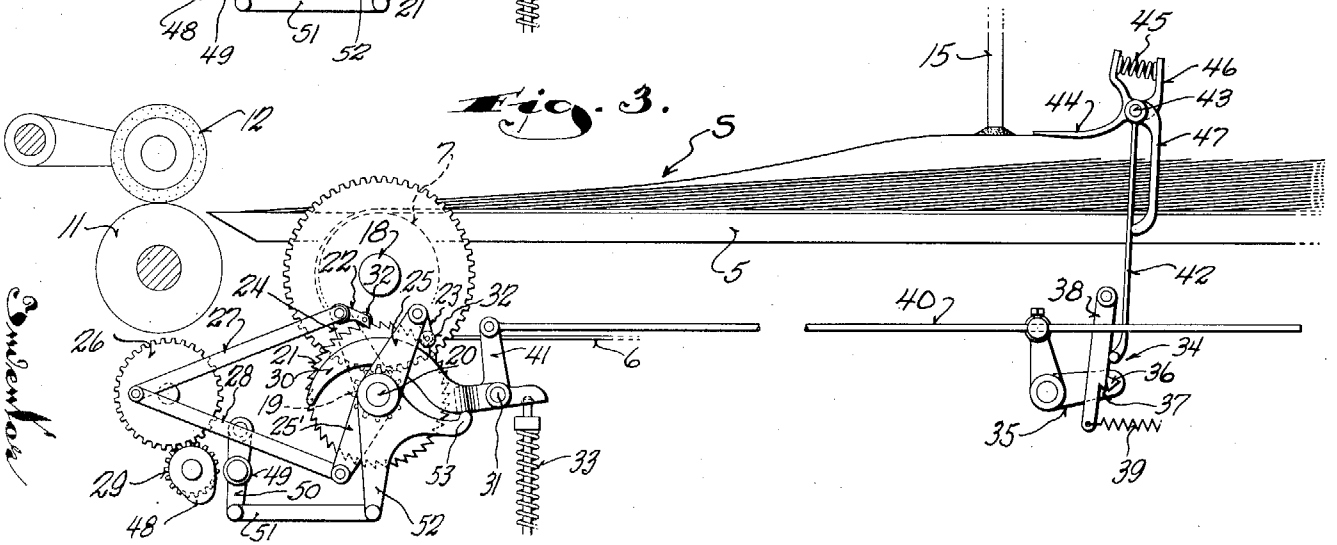
Figure 3 is a view similar to Figure 2, but showing the manner in which the lifting of the sheet controls the functioning of the bank advancing mechanism.

A spring 33 yieldingly tends to swing the masks down out of their operative positions, as shown in Figure 3, to allow the pawls to engage the ratchet wheel, but the masks are latched in their operative positions by a latch 34. The latch 34 comprises a bell crank lever 35 carrying a lug or pin 36 at the outer end of one of its arms to engage a shoulder 37 at the lower end of a depending lever 38. A light spring 39 pulls the lever 38 toward the lug or pin so that after detachment of the lug or pin from the shoulder, as shown in Figure 3, clockwise movement of the bell crank lever 35 effects reengagement of the lug with said shoulder.

The other arm of the bell crank lever 35 is adjustably connected to a connecting rod 40 which has one end pivoted to a lever 41 fixed to the masks 30 so that the masks and the bell crank lever 35 move in unison. Hence, it will be seen that the spring 33 constantly tends to swing the bell crank lever 35 in a counterclockwise direction, which tendency is opposed by the engagement of the lug 36 with the shoulder on the lever 38 to hold the masks in their operative raised positions.

Whenever forward feeding of the bank is required, the latch is tripped by means of a finger 42 pivoted on a shaft 43 carried by the frame of the separator mechanism 13. The lower end of the finger 42 is bent toward the lever 38 to engage the same and move it away from the lug 36. To so move the finger 42 and trip the latch, a feeler 44 pivoted on the shaft 43 which extends across the bank, is located to overlie the tail-end portion of the topmost sheet when the bank is in such position that forward advance thereof is required. Hence, upon lifting of the top sheet, the feeler is raised, as shown in Figure 3.

This motion of the feeler is transmitted to the finger 42 through a spring 45 acting upon a lever 46 which is nonrotatably secured to the shaft 43 adjacent to the feeler 44, and a second lever 47 also secured to the shaft 43.

After the latch has been tripped and the required forward advance of the bank has been effected so that the tail-end of the topmost sheet clears the feeler 44, the masks are restored to their operative positions holding the pawls out of engagement with the ratchet wheel by a cam 48. This cam rotates with the pinion 29 and engages a cam follower 49 carried by a lever 50 pivotally mounted adjacent to the cam 48. Motion imparted to the lever 50 by the cam is transmitted through a link 51 to a bell crank lever 52 pivoted on the shaft 20 and having a foot 53 to engage and lift the masks when they are in their lowered inoperative positions.

While the masks are lifted once for each cycle of the machine by this mechanism, unless the bank has been advanced a sufficient distance to permit the latch to be engaged, the masks are again dropped to allow continued feeding of the bank.

From the foregoing description taken in connection with the accompanying drawings, it will be readily apparent to those skilled in the art, that this invention improves the feeding of the bank in continuous feeders, and that it entirely precludes the objectionable slipping which was heretofore encountered, and that it provides more positive and simplified mechanism for determining when the bank advancing means is to function.

What I claim as my invention is:

1. In a sheet feeding machine of the continuous type having a feed board to support a bank of sheets, separating and forwarding mechanism operable on the topmost sheet, and means for advancing the bank of sheets over the board: intermittent drive mechanism for said sheet advancing means to properly position the topmost sheet with respect to the separating and forwarding mechanism, said sheet advancing means being operable throughout a complete cycle of the machine so that the advance of the bank of sheets to the separating and forwarding mechanism is substantially continuous.

2. In a sheet feeding machine of the continuous type having a feed board to support a bank of sheets and means for advancing the sheets over the board: drive mechanism for said sheet advancing means comprising a ratchet wheel; a pair of alternately operable pawls acting on said ratchet wheel; and common means for reciprocating said pawls.

3. In a sheet feeding machine of the continuous type having a feed board to support a bank of sheets and means for advancing the sheets over the board: drive mechanism for said sheet advancing means comprising a ratchet wheel; a pair of alternately operable pawls acting on said ratchet wheel; common means for reciprocating said pawls; and means for driving said last named pawl reciprocating means at such speed that one pawl is active throughout one cycle and the other is active throughout the next cycle.

4. In a sheet feeding machine of the continuous type having a feed board to support a bank of sheets and means for advancing the sheets over the board: a drive for said sheet advancing means comprising, a member rotating at such speed as to have one revolution to two cycles of the machine; a pair of oppositely moving motion transmitting elements driven from said rotating member so that one operates continuously through one cycle of the machine and the other operates continuously through the next cycle of the machine; and means for transmitting the motion thus produced to said sheet advancing means.

5. In a sheet feeding machine of the continuous type having a feed board to support a bank of sheets and means for advancing the sheets over the board: a drive for said sheet advancing means comprising a ratchet wheel having a driving connection with said sheet advancing means; two pawls arranged to alternately advance said ratchet wheel; means for alternately reciprocating said pawls in such timed relation to the operation of the machine that one pawl is active continuously through one cycle of the machine and the other is active continuously through the next cycle of the machine; and means controlled by the removal of the topmost sheet from the bank for controlling the connection between said pawls and the ratchet wheel.

6. In a sheet feeding machine: a movable support for a bank of sheets; means for moving the support to advance the bank of sheets; drive mechanism for actuating said sheet support including a separable driving connection; a latch for holding said separable driving connection disengaged; and means actuated by the lifting of a sheet off said bank for tripping the latch.

7. In a sheet feeding machine of the character described: a movable support for a bank of sheets; means for driving the support to advance the bank of sheets; control means for determining when said drive means is to function including a latch; and means to trip said latch including a feeler disposed over the rear edge portion of the topmost sheet of the bank so that the lifting of said sheet engages the feeler to trip the latch.

8. In a continuous type sheet feeder having a movable support for a bank of sheets: means to actuate the support and advance the bank; a drive for said means including a separable driving connection; and means operable by the lifting of the tail-end portion of the topmost sheet from the bank for controlling said separable driving connection.

9. In a continuous type sheet feeder having a movable support for a bank of sheets: a drive for said movable support including a separable driving connection; means tending at all times to render said driving connection operative; a latch for holding said driving connection inoperative; and means for tripping the latch including a feeler disposed over the top of the bank of sheets and adapted to be actuated by the lifting of the rear edge portion of the topmost sheet.

10. In a continuous type sheet feeder having a movable support for a bank of fanned-out sheets: means for actuating said sheet support to advance the bank; a control for determining when said means is to operate comprising a feeler so located with respect to the path of the sheets as to just clear the tail-end portion of the topmost sheet when the bank is in proper position and to be lifted by the tail-end portion of the topmost sheet upon separation of said top sheet from the bank when the bank requires advancing.

11. In a sheet feeder of the continuous type having a movable support for a bank of fanned-out sheets: means for advancing said bank; and a control for said advancing means operated by the lifting of the tail-end portion of the topmost sheet from the bank.

12. In a continuous type sheet feeder: a movable support for a bank of fanned-out sheets; means for driving said support to advance the bank; and a sheet feeler resting on top of the bank and so located as to be cleared by the tail-end portion of the topmost sheet when the bank is in proper position and to be moved by the lifting of the tail-end portion of said topmost sheet when the bank requires advancing.

13. In a sheet feeder: a movable support for a bank of sheets; separator mechanism having a regular operating cycle for removing sheets from the bank as the sheet support presents them to the separator mechanism; a plurality of motion generating means driven in such timed relation to the operation of the separator mechanism that one of said motion generating means is active throughout one cycle of the separator operation and another is active throughout the next cycle of the separator operation; and means for translating the motion thus produced into a continuous drive for said sheet support so as to continuously and slowly advance the bank of sheets toward the separator mechanism.

14. In a sheet feeding machine of the character described: a movable support for a bank of sheets; separating and forwarding mechanism operable on the rear edge portion of the sheet to lift the same off the bank; means for driving the support to advance the bank of sheets into position for the separating and forwarding mechanism to act upon the topmost sheet; control means for determining when said drive means is to function including a latch; and means to trip said latch including a feeler positioned to be engaged by the rear edge portion of a sheet lifted off the bank.

15. In a continuous type sheet feeder having a movable support for a bank of sheets: means to actuate the support and advance the bank; a drive for said means including a separable driving connection; separating mechanism successively operable on the topmost sheets to pick the same off the bank; and means operable by the lifted tail-end portion of the topmost sheet for controlling said separable driving connection.

16. In a continuous type sheet feeder having a movable support for a bank of sheets: a drive for said movable support including a separable driving connection; means tending at all times to render said driving connection operative; a latch for holding said driving connection inoperative; separating mechanism successively operable on the topmost sheets to pick the same off the bank; and means for tripping the latch including a control element adapted to be acted upon by the lifted rear edge portion of the topmost sheet.

17. In a sheet feeder of the continuous type having a movable support for a bank of fanned-out sheets: means for advancing said bank; separating mechanism successively operable on the topmost sheets to pick the same off the bank; and a control for said advancing means operated by the lifted tail-end portion of the topmost sheet.

18. In a sheet feeding machine of the character described: a movable support for a bank of sheets; separating and forwarding mechanism operable on the rear edge portion of the sheet to lift the same off the bank and forward it; means for driving the support to advance the bank of sheets into position for the separating and forwarding mechanism to act upon the topmost sheet; and control means for the bank advancing means controlled by the rear edge portion of a sheet lifted by the separating and forwarding mechanism.

19. In a sheet feeding machine: a support for a bank of sheets; separating mechanism successively operable on the topmost sheets to pick the same off the bank; a control element engageable with the rear edge portion of the lifted topmost sheet and movable thereby; and means controlled by motion of the control element for advancing the bank in the event the location of said topmost sheet is insufficiently advanced with respect to the control element.

20. In a sheet feeding machine: a support for a bank of sheets; means for advancing said bank; separating mechanism successively operable on the topmost sheets to pick the same off the bank; and control means for the bank advancing means having a control element engageable with the lifted rear edge portion of the topmost sheet, said element being operable to effect the functioning of the bank advancing means in the event the location of said sheet is insufficiently advanced with respect to the control element.

21. In a sheet feeder: a support for a bank of sheets; means for advancing said bank; separating mechanism successively operable on the topmost sheets to pick the same off the bank; and control means coacting with the lifted trailing portion of the foremost of said sheets and operable to initiate the functioning of the bank advancing means whenever said foremost sheet is insufficiently advanced.

22. In a continuous type sheet feeder in which the sheets are brought to a feed off position in a fanned-out bank; means for advancing the bank toward said feed off position; separating and feed off means operable on the topmost sheet in feed off position to lift the same and feed it off the bank; and control means coacting with the lifted trailing portion of the foremost sheet of the bank before feed off motion of said sheet begins for initiating the functioning of the bank advancing means whenever the bank is insufficiently advanced.

23. In a sheet feeder of the continuous type in which the sheets are advanced in a bank to a predetermined feed off position: means for advancing the bank; and a control for said bank advancing means having a part cooperable with the rear edge portion of the topmost sheet whenever said raised topmost sheet is insufficiently advanced and operable through said coaction to effect functioning of the bank advancing means so that the operation of the bank advancing means is dependent upon the position of the topmost sheet with relation to its edgewise forward travel.

FRANK R. BELLUCHE.